(12) United States Patent  
Holeva

(10) Patent No.: US 7,764,383 B1  
(45) Date of Patent: Jul. 27, 2010

(54) ADAPTIVELY DETERMINING THE SIGN IN A FRINGE COUNT DETECTION SYSTEM

(75) Inventor: Lee Francis Holeva, Fort Wayne, IN (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 187 days.

(21) Appl. No.: 12/133,538

(22) Filed: Jun. 5, 2008

(51) Int. Cl.  
G01B 9/02 (2006.01)  
G01J 3/45 (2006.01)

(52) U.S. Cl. .................................................. 356/451

(58) Field of Classification Search ............... 356/450, 356/451, 456  
See application file for complete search history.

(56) References Cited

U.S. PATENT DOCUMENTS 4,453,827 A * 6/1984 Taboada ..................... 356/520  
7,649,160 B2 * 1/2010 Colomb et al. ............. 250/201.9  
2003/0112444 A1 * 6/2003 Yang et al. .................. 356/486

* cited by examiner

*Primary Examiner*—Patrick J Connolly  
(74) *Attorney, Agent, or Firm*—RatnerPrestia

(57) ABSTRACT

A method includes extracting phase due to fringe count error (FCE) in spectra formed by an interferometer. The exemplary method includes the steps of: (a) forming an earth scene spectrum; (b) forming a background reference spectrum; and (c) forming a phase extraction function, $R_k$, where k is a $k^{th}$ channel of the interferometer. The phase extraction function is formed from the earth scene spectrum and background reference spectrum. The method may also include the steps of (d) using recursive least squares (RLS) to extract phase from the $R_k$ function; and (e) providing the extracted phase to a user to correct the FCE. Step (c) may include forming a term in the $R_k$ function that includes a positive or a negative sign of a square root. Step (d) may include determining whether the sign is negative or positive using the RLS.

20 Claims, 8 Drawing Sheets

ADAPTIVELY DETERMINING THE SIGN IN A FRINGE COUNT DETECTION SYSTEM

TECHNICAL FIELD

The present invention relates, in general, to a fringe counting system using a reference laser source within an interferometer. More specifically, the present invention relates to a system and method for extracting phase error from a Michelson interferometer.

BACKGROUND OF THE INVENTION

An interferometer of the Michelson type splits an input light beam into a reflected beam and a transmitted beam using a beam splitter. Each split beam travels along its own path to a return mirror, which deflects it back to the beam to splitter along the same path. One of the return mirrors is stationary, while the other is movable, typically along a linear path between two limits equidistant from a datum position. At the beam splitter, the return split beams recombine along a common output path leading to a photodetector.

If the movable mirror is at its datum position, the optical path of the two split beams is the same, so that when those split beams return to the beam splitter they constructively interfere. This results in a large signal produced at the photodetector, known as a center burst. If the movable mirror is shifted towards the incoming split beam, the optical path of that beam decreases and, conversely, if the mirror is moved away the optical path is increased. Thus, as the movable mirror is moved from one limit to another, two complete series of optical path difference values of opposite signs are generated. This travel is referred to as an optical path difference (OPD) scan. The output signal of a photodetector during an OPD scan is a series of superimposed electrical sine waves of different frequencies and amplitudes. This signal is known as an interferogram.

An interferometer also includes a reference light source, typically a laser, which is used to measure the optical path difference (OPD). The reference fringes created during an OPD scan are sensed by a photodetector, which generates a reference fringe signal as a sine wave.

In carrying out an analysis of a sample, an interferometer executes a number of scans, sweeping forward and backwards through the center burst of the infrared interferogram, generating a series of analog-to-digital converter (ADC) readings during part of each scan. The reference fringe signal is used to determine the exact times at which the ADC in the interferogram channel is read, in order to build up a sampled interferogram with constant optical path difference intervals.

In practice, changes in scan direction may occur at slightly different optical path difference values in different sweeps. Lack of detailed knowledge about is where reversals occur in a fringe waveform leads to uncertainty in the absolute optical path difference of points read by the ADC in subsequent scans. If the position of the optical path difference varies by a few microns between each scan, this significantly affects the accuracy of added interferograms and, consequently, affect the quality of the transformed spectra.

One system, as an example, is the cross-track infrared sounder (CrIS) system, which is a Michelson interferometer that measures with high resolution and high spectral accuracy the emission of infrared radiation from the atmosphere in three bands in the spectral range from 3.9 to 15.4 μm (650-2250 cm$^{-1}$). The core of the instrument is a Fourier transform spectrometer, which measures in one sweep the spectral features of the atmosphere. The spectrometer transforms the incoming spectral radiance, i.e. the spectrum, into a modulated signal, the interferogram, where all infrared wavenumbers in the band of interest are present simultaneously. The output from the spectrometer includes one such interferogram for each observed scene.

The CrIS system includes a spaceborne sensor and ground-based algorithms, as shown in FIG. 1. As shown, CrIS system 10 includes space segment 12 and ground segment 14. A sensor 18 resides in spacecraft (S/C) 16 and obtains raw unprocessed interferograms that are sampled from any of nine different field-of-views (FOVs) and from any of three IR spectral bands. The sensor 18 may measure the following three types of scenes: (a) the spectral radiance of the earth and its atmosphere, (b) the spectral radiance of deep space, and (c) the spectral radiance of the instrument itself as compared to a known blackbody source.

Of all the measurement types listed, only the spectra of the atmosphere contains the desired scientific information. All other measurements are characterization measurements for calibration of sensor 18. Using the results from these characterization measurements, a calibration procedure may then be applied to the scene measurements of the atmosphere.

The ground segment 14 includes command, control and communications system 20 to spacecraft 16 and desired algorithms, such as SDR algorithms 22 and EDR algorithms 24. The SDR algorithms 22 are required to transform raw instrument records (RDRs) into sensor data records (SDRs), the latter is being essentially the calibrated spectra. The SDRs are subsequently transformed into environmental data records (EDRs) by EDR algorithms 24.

Referring next to FIG. 2, there is shown more detail of space segment 12. The interferometer 30 observes three different types of scenes: (1) earth scene (ES), deep space (DS) and internal calibration target (ICT) scenes. After passage of the observed scene through detector 32, amplifier 33 and ADC 34, the real function of the interferogram, I(x), is produced. Noise spike correction of the raw interferogram data may be accomplished by impulse noise clipper 35. The spikes may be present anywhere in the interferogram, near or far from the ZPD. Performing filtering and decimation on the raw interferograms, as shown, may provide more effective results than performing the same via software on the ground. The clipped signal may be filtered by a 255 tap FIR, designated as 36. The output signal from the FIR may be a complex interferogram, including real and imaginary functions. Next, the output signal is bit-trimmed (module 37) and packet encoded (module 38) and downlinked to the ground station as raw data records (RDRs) 39.

As an example, using the CrIS system, the total number of raw sampling points corresponding to the OPD sweep is shown, in Table 1, below. Measured raw data points are then filtered and decimated, as shown, to lower the transfer data rate. The decimation factor used in each band depends on the bandwidth. A set of nominal spectral channel wavenumbers may be provided as an output. The number of output bins or channels is also shown, as an example.

TABLE 1

CrIS signal dimensions (an example)

| Band | OPD samples | Decimation factor | Decimated points | Output bins |
|------|-------------|-------------------|------------------|-------------|
| LW   | 20 736      | 24                | 864              | 713         |
| MW   | 10 560      | 20                | 528              | 433         |
| SW   | 5 200       | 26                | 200              | 159         |

The CrIS instrument observes the ground with an instantaneous FOV which maps to a nadir footprint of 14 km on the ground, from an altitude of 833 km. The field of regard (FOR) of the instrument is shown in FIG. 3.

A typical CrIS scan sequence may include 34 interferometer sweeps, as shown in FIG. 4, including 30 earth scenes, plus 2 deep space and 2 ICT measurements (these numbers include both forward and reverse sweeps). One scan of the CrIS sensor takes about 8 seconds. The sensor may perform a new measurement (sweep) every 200 ms (7 ms for pointing and 33 ms for repositioning). A new cycle (scan) is repeated every 8 seconds. Each scan includes 918 interferograms.

The two calibration measurements (DS and ICT) are performed once every 8 seconds, in order to account for changing self-emission of the instrument due to temperature variations in orbit.

For a complete description of the CrIS system and its various algorithms, one may refer to the following web document, which is incorporated herein by reference in its entirety:

http://eic.ipo.noaa.gov/IPOarchive/SCI/atbd/BOM-CrIS-00672-SDR-ATBD.pdf

SUMMARY OF THE INVENTION

To meet this and other needs, and in view of its purposes, the present invention provides a method of extracting phase due to fringe count error (FCE) in spectra formed by an interferometer. The method includes the steps of: (a) forming an earth scene spectrum; (b) forming a background reference spectrum; (c) forming a phase extraction function, $R_k$, where k is a $k^{th}$ channel of the interferometer, using the formed earth scene spectrum and the background spectrum; (d) using recursive least squares (RLS) to extract phase from the $R_k$ function; and (e) providing the extracted phase to a user to correct the FCE.

Step (c) may include forming a term in the $R_k$ function that includes a positive or a negative sign of a square root; and step (d) may include determining whether the sign is negative or positive using the RLS.

Step (d) further includes extrapolating a phase at channel k to a phase at channel k+1 using the RLS; determining a first phase at channel k+1 resulting from using a positive sign of the square root in the phase extraction function; determining a second phase at channel k+1 resulting from using a negative sign of the square root in the phase extraction function; and selecting one of the determined first or second phase at channel k+1, based on the determined first or second phase that minimizes an absolute error to the extrapolated phase.

Step (d) may include determining at least one value of phase at a first frequency, where the first frequency is a frequency operating at channel k=0 of the interferometer; and extrapolating the determined value of phase to a next frequency operating at channel k=1 of the interferometer.

Extrapolating the determined value of phase includes (1) determining a first value of phase at channel k=0 assuming a positive sign in the square root of the phase extraction function and extrapolating the first value of phase to a next channel, k=1, of the interferometer; and (2) determining a second value of the phase at channel k=0 assuming a negative sign in the square root of the phase extraction function and extrapolating the second value of phase to the next channel, k=1, of the interferometer.

Extrapolating the first and second value of phases includes performing a separate RLS over a bandwidth of k frequencies to obtain, respectively, first and second sets of adaptive phases, and selecting one of the first and second sets of adaptive phases that satisfies a predetermined rule. An exemplary rule is [the sign of a median phase in the set of adaptive phases]=[the sign of a mean phase slope in the set of adaptive phases].

Step (d) further includes using the RLS to determine a line having a positive or negative slope, where the line represents phases at k frequencies, and the slope of the line represents a number of fringe errors. The number of fringe errors is proportional to the slope of the line, and a horizontal line represents no fringe error.

In another embodiment of the present invention, when using a phase extraction function of an interferometer at channel number k, where the phase extraction function includes a square root sign that is either positive or negative, the present invention includes a method of determining whether the sign is positive or negative. The method includes the steps of: RLS-computing a first set of phases as a function of channel number k, using the phase extraction function, assuming a positive square root sign beginning at k=0; RLS-computing a second set of phases as a function of channel number k, using the phase extraction function, assuming a negative square root sign beginning at k=0; selecting the first or second set of phases based on a predetermined rule; and providing the selected first or second set of phases to a user for correcting fringe count errors (FCE) of the interferometer.

Selecting the first or second set of phases is based on the following sub-steps: separately determining a sign of a median phase in the first and second sets of phases; separately determining a sign of a mean phase slope in the first and second sets of phases; and selecting the first or second set of phases satisfying the following equality: [the sign of the median phase=the sign of the mean phase slope].

The RLS-computing includes (1) extrapolating phase from channel k to channel k+1, assuming a positive square root sign; (2) extrapolating phase from channel k to channel k+1, assuming a negative square root sign; and (3) selecting the extrapolated phase in channel k+1 that minimizes an absolute error to the extrapolated phase. The RLS-computing further includes calculating phase values as a function of frequency, where the phase values as a function of frequency is a straight line plotted on X,Y axes having a Y-intercept at k=0.

Yet another embodiment of the present invention includes a computer for executing an algorithm for determining fringe count error (FCE) of an interferometer. The computer executes the steps of: (1) forming a phase extraction function from earth scene and calibration spectra, where the phase extraction function varies with frequency and includes a square root sign that is either positive or negative at each frequency; and (2) determining whether the square root sign is positive or negative at each frequency using an RLS method. Also included are (3) letting the square root sign be positive at a starting frequency, and calculating a first set of phases as a function of frequency; (4) letting the square root sign be negative at the starting frequency, and calculating a second set of phases as a function of frequency; and (5) selecting the first or second set of phases based on a predetermined rule.

Selecting the first or second set of phases may be based on satisfying the following equality for each set of phases: [sign of the median phase]=[sign of the mean phase slope].

Using the RLS method includes extrapolating phase from frequency k to frequency k+1, assuming a positive square root sign; extrapolating phase from frequency k to frequency k+1, assuming a negative square root sign; and selecting the extrapolated phase at frequency k+1 that minimizes an absolute error to the extrapolated phase.

It is understood that the foregoing general description and the following detailed description are exemplary, but are not restrictive, of the invention.

BRIEF DESCRIPTION OF THE FIGURES

The invention may be understood from the following detailed description when read in connection with the following figures.

DETAILED DESCRIPTION OF THE INVENTION

Figure 1:
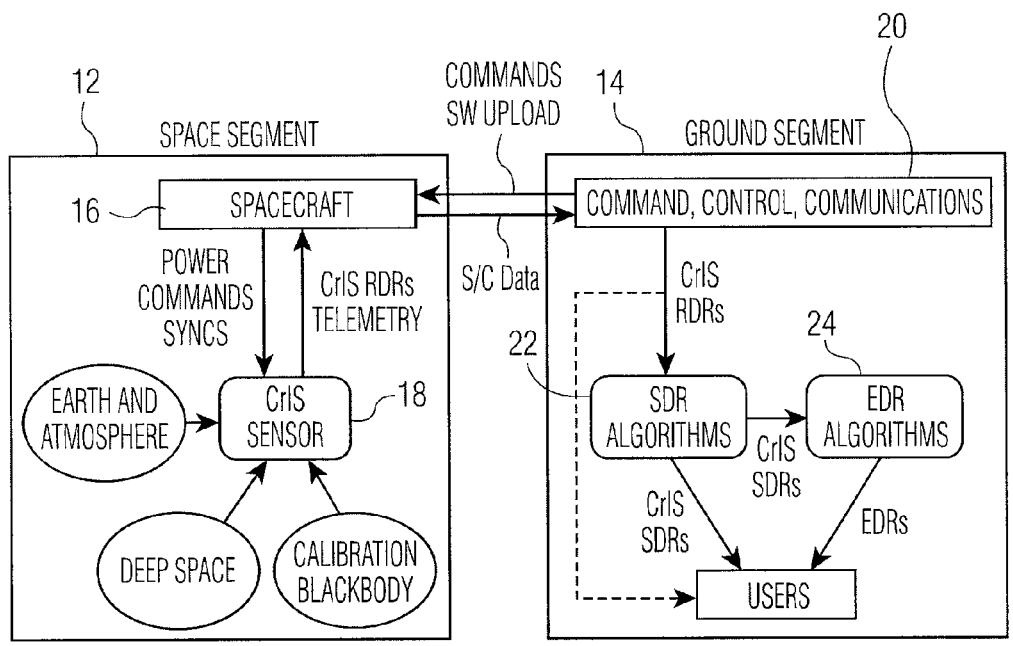
FIG. 1 is a block diagram of a space based sensor for observing earth and deep space radiation and a ground station for processing the observed radiation.
Figure 2:
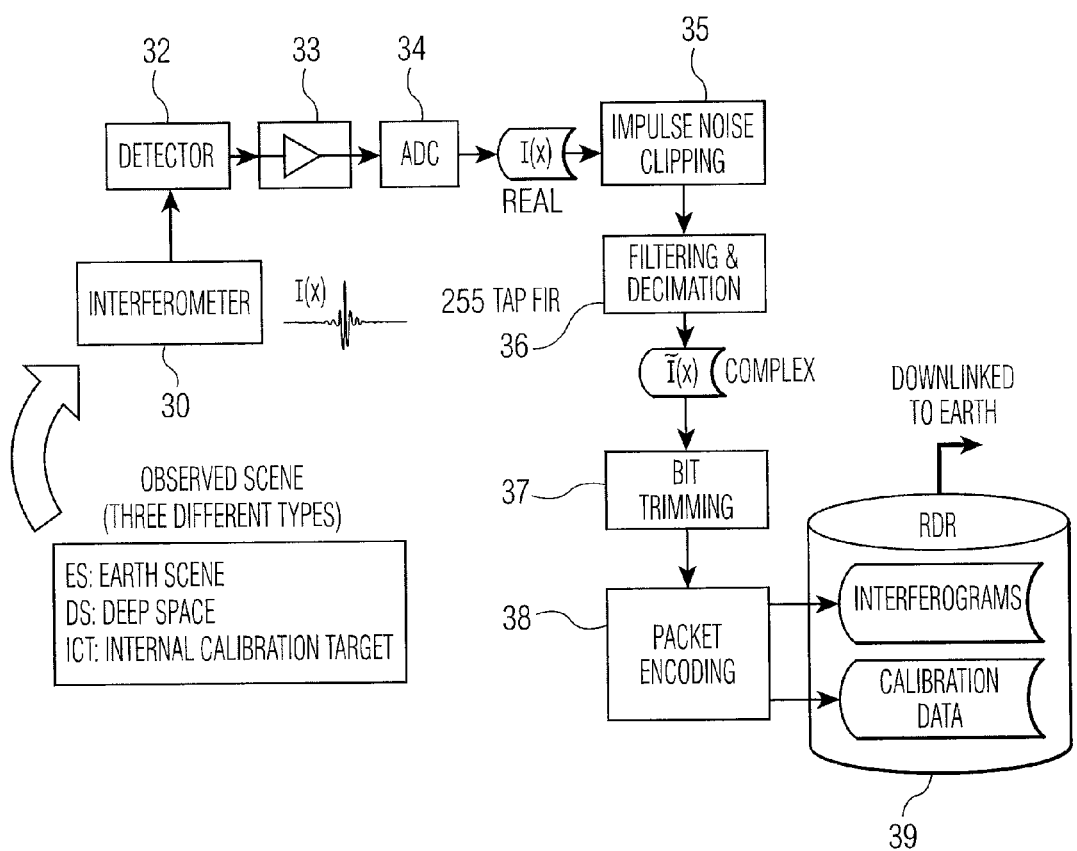
FIG. 2 is a functional block diagram showing various modules of the space based sensor shown in FIG. 1.
Figure 3:
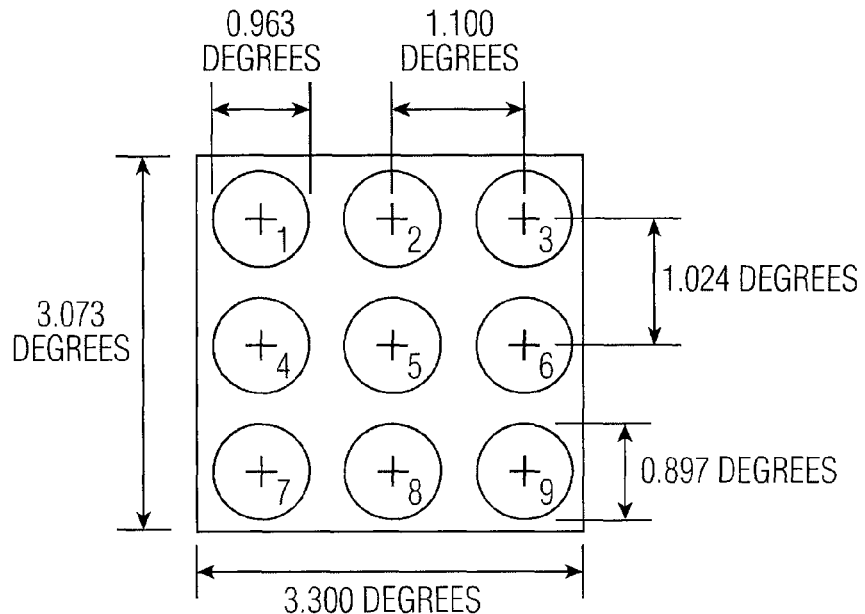
FIG. 3 is a diagram of a field of view (FOV) of an array of detectors used by the space based sensor shown in FIG. 1.
Figure 4:
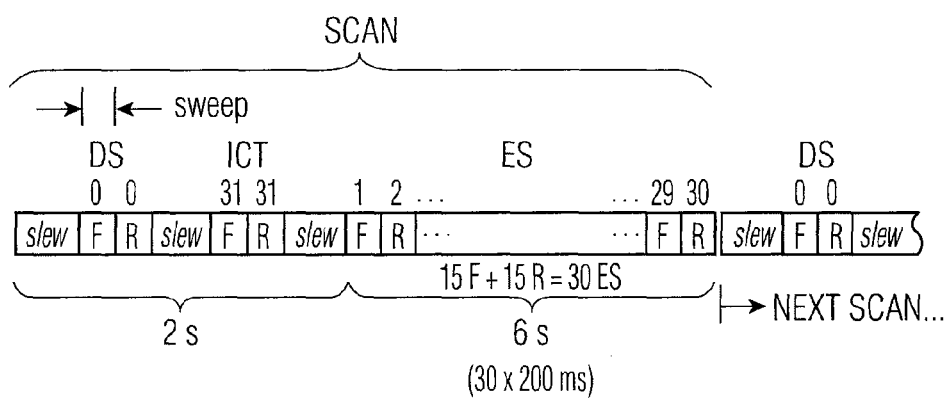
FIG. 4 is a timing diagram depicting a typical scanning sequence for observing deep space (DS), internal calibration target (ICT) and earth scenes (ES), using the space based sensor shown in FIG. 1.

If an interferometer is at a temperature of zero Kelvin, with perfectly symmetric (compensated) ports and electronics, and operates with perfect scanning speed, then measured interferograms are perfectly symmetric, resulting in a spectral signal with zero phase (real signal). However, real interferometers have measurement errors.

A reason for obtaining non-zero imaginary components out of an interferogram is lack of mirror-symmetry about the ZPD point (x=0). The asymmetry originates from two different sources, either extrinsic or intrinsic. Extrinsic sources may arise from sampling errors, for example. Intrinsic asymmetry may be due to wavenumber-dependent phase delays of either the optics or the electronics. One example of an intrinsic phase error is due to the beamsplitter/compensator (BS/CP). Because the majority of BS coating materials is placed at one side of a dispersive substrate, the index of refraction of the substrate affects each wavelength in a different way. The ZPD of each monochromatic interferogram is at a different spatial location. This is the most common source of phase error.

None of the interferogram sampling positions coincides exactly with the position of ZPD. This is generally the case and causes a phase linear in wavenumber ($\sigma$). This effect may be corrected by calibration, if it remains constant during calibration and scene measurements.

If fringe counts are lost during a sweep, however, the effect is more dramatic and constitutes a phase error. If fringe count errors occur at turn-around, to corrective linear phase shifts may be applied to realign measurements on the same reference. If a fringe count error occurs "in-sweep", the last part of the interferogram may be shifted with respect to the first part of that interferogram. This effect results in a distortion of the measurement that is difficult to recover.

When a scene contains some sort of continuous background, the ZPD position may be determined. However, if the scene contains only sparse spectral lines, for example, a strong ZPD point is not available as a reference. Moreover, if the signal suffers from strong phase dependencies to wavenumber, it may be difficult to identify the true ZPD point.

When the interferogram is filtered and decimated, for example, the ZPD region is further affected and the maximum intensity point may be difficult to identify. In addition, a shift by a number of points smaller than the decimation factor produces only a small shift of the decimated interferogram. For example, a shift in a 20 times decimated interferogram is 1/20 the effective sampling interval, if the fringe error is one point. Therefore, monitoring of the ZPD position of a decimated interferogram is not a sensitive approach to detect fringe count errors.

A possible approach for fringe count error (FCE) detection includes an analysis of the linear wavenumber dependent residual phase that results from comparing the ES, ICT and DS signals relatively to each other. A shift in one of these signals with respect to the two others produces a phase error that increases linearly with wavenumber.

As the phase extraction process is mathematically processed in the spectral domain, the FCE detection is performed on complex spectra. The correction may be done by multiplication with a linear shifting phase, as described below.

The phase contributions of an interferometer (or instrument) may be grouped into the following:

1. An equivalent phase dependency of the observed scene, corresponding to incident photon flux through the field-of-view (FOV) of the instrument: $e^{i\phi^{ext}}$.
2. A phase dependency on the instrument itself, corresponding to the light not coming through the scanned FOV, like the thermal emissions of various surrounding parts of the interferometer (instrument contribution), dispersion effects and thermal emission of the beamsplitter, electronics effects, etc.: $e^{i\phi^{in}}$.
3. Amplitude functions proportional to each observed scene: $A^x$ (real functions).

Figure 5:
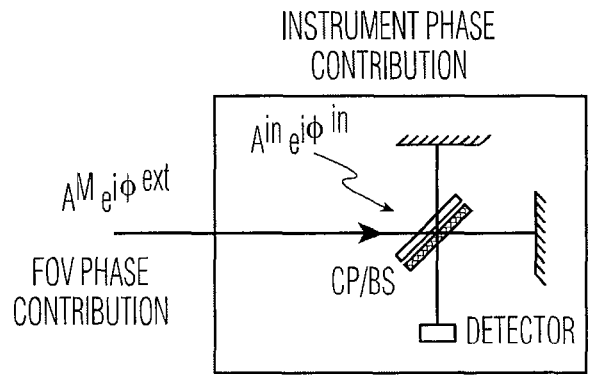
FIG. 5 is a functional diagram showing phase contributions due to the field-of-view (FOV) and the internal beamsplitter/compensator of an interferometer.

The instrument phase contributions account for the situation in which the phase response for radiance from the instrument itself differs from the one for radiance from an external source. The main mechanism responsible for this dual phase interferometer response is emission from the beamsplitter, as is functionally depicted in FIG. 5.

More specifically, a given measurement may be described as follows:

$$\tilde{S}^M = \underbrace{A^M e^{i\phi^{ext}}}_{\text{scene contribution}} + \underbrace{A^{INT} e^{i(\phi^{INT}+\delta_1)} + A^{BS} e^{i(\phi^{BS}+\delta_2)}}_{\text{instrument contribution}} = \quad (1)$$

$$A^M e^{i\phi^{ext}} + A^{in} e^{i\phi^{in}}$$

It will be appreciated that all the terms shown in Equation (1) are functions of wavenumber ($\sigma$).

The complex raw spectrum $\tilde{S}^M$ is built from the scene amplitude $A^M$ affected by the sum of the various interferometer contributions $e^{i\phi^{ext}_{INT}}$ and the instrument contribution composed of the amplitude $A^{INT}$ multiplied by phase $e^{i\phi^{INT}}$, plus the beamsplitter (BS) amplitude contribution $A^{BS}$ multiplied by phase $e^{i\phi^{BS}}$. When the BS temperature remains constant (or negligible), the second and third term may be combined vectorially as $A^{in}e^{i\phi^{in}}$ to simplify the measurement.

If the observed scene is much colder than the instrument ($T^C \ll T^{in}$) and has a sufficiently high $\sigma$, then $A^C \ll A^{in}$, suggesting that this measurement may be considered as the instrument offset itself: $\tilde{S}^C \approx A^C e^{i\phi^{ext}}$. This is true for a space-borne instrument observing deep space ($\approx 4$ K) as a cold reference.

Following the above assumptions, three basic phase measurements may be taken:

(1) A deep space (DS) measurement, in which the instrument is looking at deep space that represents a source of low (negligible) IR radiance, where the measured interferogram is related to self-emission of the instrument.

(2) An internal calibration target (ICT) measurement, in which the instrument is looking at an internal calibrated blackbody.

(3) An earth scene (ES measurement, in which the instrument is looking at scenes of the earth and its atmosphere.

These three phase measurements may be summarized as follows:

| | |
|---|---|
| Cold reference: | $\tilde{S}^C = A^{in}e^{i\phi^{in}}$ |
| Hot reference: | $\tilde{S}^H = A^H e^{i\phi^{ext}} + A^{in}e^{i\phi^{in}}$ |
| Scene Measurement: | $\tilde{S}^S = A^S e^{i\phi^{ext}} + A^{in}e^{i\phi^{in}}$ |

The phase shift is not measured in an absolute way, but in a relative way to a reference spectrum. For reference calibration signals, detection is done with respect to a previous mean measurement. Since the current and previous spectra are equivalent (always looking at the DS or at the same reference blackbody), the instrument phases may be cancelled out, and their ratio may be used to compute a phase extraction function, $\tilde{R}(\sigma)$, which is needed for linear phase extraction (here $\phi_h = -2\pi h \lambda_L$).

For the cold reference, the following phase extraction function may be obtained, where the bracket denotes a mean scene measurement:

$$\tilde{R}(\sigma) = \frac{\tilde{S}^C(\sigma)}{\langle \tilde{S}^C \rangle(\sigma)} = \frac{e^{i\phi_h}(0 + A^{in}e^{i\phi^{in}})}{0 + A^{in}e^{i\phi^{in}}} = e^{i\phi_h} \quad (2)$$

For the hot reference, the following phase extraction function may be obtained, where the bracket denotes a mean scene measurement:

$$\tilde{R}(\sigma) = \frac{\tilde{S}^H(\sigma)}{\langle \tilde{S}^H \rangle(\sigma)} = \frac{e^{i\phi_h}(A^H e^{i\phi^{ext}} + A^{in}e^{i\phi^{in}})}{A^H e^{i\phi^{ext}} + A^{in}e^{i\phi^{in}}} = e^{i\phi_h} \quad (3)$$

Because the measured earth scenes are different one to another, however, a previous scene measurement may not be used as a reference, as is done in the calibration measurements. Earth scene measurements $\tilde{S}^{es}(\sigma)$ may be processed as follows, in order to isolate the linear fringe count dependency:

$$\tilde{P}(\sigma) = \frac{\tilde{S}^S}{\langle \tilde{S}^H \rangle - \langle \tilde{S}^C \rangle} = \frac{e^{i\phi_h}(A^S e^{i\phi^{ext}} + A^{in}e^{i\phi^{in}})}{(A^H e^{i\phi^{ext}} + A^{in}e^{i\phi^{in}}) - A^{in}e^{i\phi^{in}}} = e^{i\phi_h}\left[\frac{A^S}{A^H} + \frac{A^{in}}{A^H}e^{i(\phi^{in}-\phi^{ext})}\right] \quad (4)$$

$$\tilde{Q}(\sigma) = \frac{\langle \tilde{S}^C \rangle}{\langle \tilde{S}^H \rangle - \langle \tilde{S}^C \rangle} = \frac{A^{in}}{A^H}e^{i(\phi^{in}-\phi^{ext})} \quad (5)$$

$$\tilde{R}(\sigma) = \frac{\tilde{P}(\sigma)}{\pm\sqrt{|\tilde{P}(\sigma)|^2 - \text{Im}\{\tilde{Q}(\sigma)\}^2} + i\text{Im}\{\tilde{Q}(\sigma)\}} = e^{i\phi_h} \quad (6)$$

Once the spectral phase extraction function $\tilde{R}(\sigma)$ is calculated, its associated linear phase shift may be computed using the following relationship:

$$\varphi(\sigma) = a\tan\left\{\frac{\text{Im}\{\tilde{R}(\sigma)\}}{\text{Re}\{\tilde{R}(\sigma)\}}\right\} \quad (7)$$

In the presence of an FCE, an additional contribution from the signal appears in the imaginary part of $\tilde{R}(\sigma)$. This contribution manifests itself in a signal phase that increases linearly as a function of the spectral frequency.

Once the OPD shift, h, is known, a correction of a shifted undecimated interferogram involves shifting the interferogram back to its correct position. This is done by removing a number of points equal to the shift at one end of the interferogram, the one end corresponding to the direction of the shift. These removed points may be placed at the other end of the interferogram, using the implicit periodicity of the Fourier transform.

The correction of a shifted and decimated interferogram, however, is more difficult. This is because the shift is not necessarily an integer multiple of the decimation factor. Therefore, the decimated interferogram may have to be shifted by a fractional number of points. This requires interpolation. One approach is to compute, in the spectral domain, a direct multiplication with the inverse phase function, as shown by the following equation:

$$\tilde{S}(\sigma)' = \tilde{S}(\sigma)e^{+2\pi i h b \lambda_L \sigma} \quad (8)$$

Since the space target is at very low temperature, the radiance measured by the instrument is nearly entirely due to instrument internal emission. A model of the ICT, DS and ES spectra may be given by:

$$S_k^{ICT} = A_k^{ICT} \cdot e^{i\phi_k^{EXT}} + A_k^{IN} \cdot e^{i\phi_k^{IN}}, \quad (9)$$

$$S_k^{DS} = A_k^{DS} \cdot e^{i\phi_k^{EXT}} + A_k^{IN} \cdot e^{i\phi_k^{IN}},$$

$$S_k^{ES} = A_k^{ES} \cdot e^{i\phi_k^{EXT}} + A_k^{IN} \cdot e^{i\phi_k^{IN}},$$

where k is the channel number, and $A_k^{ICT}, A_k^{DS}, A_k^{ES}$, and $A_k^{IN}$ are the magnitude of radiance for ICT, DS, ES and the instrument internal emission, respectively.

The phase of the part of spectra corresponding to external radiance $\phi_k^{EXT}$ and internal emission radiance $\phi_k^{IN}$ are, in general, similar for all field of regards (FOR). Since $A_k^{DS}$ is substantially smaller than other sources of radiances, it is assumed that $A_k^{DS}=0$.

In particular, the algorithm assumes that a phase shift may have occurred, that is $$S_k^{ES} = e^{ih_k}(A_k^{ES} \cdot e^{i\phi_k^{EXT}} + A_k^{IN} \cdot e^{i\phi_k^{IN}}).$$

The algorithm determines the value of phase shift $h_k$. The signature of FCE is that there exists a linear relationship between the phase shift and wavenumber of the channel. If the slope of a line representing the relationship between $h_k$ and the wavenumber for channel k is an integer multiple n of $2\pi\Delta\mu$, where $\Delta\mu$ is the spectral resolution, then an FCE error of n fringes may be detected.

The FCE detection algorithm may first extract the phase shift $h_k$ by assuming that there is no FCE between averaged ICT and DS spectra, which may be denoted by $\langle S_k^{ICT}\rangle$ and $\langle S_k^{DS}\rangle$ respectively.

It may be assumed that the absolute DS radiance $A_k^{DS}$ is negligible compared to the absolute radiances $A_k^{ICT}, A_k^{ES}$ and $A_k^{IN}$ for ICT, ES and the instrument internal emission, respectively. For each ES spectrum, the following may be computed:

$$P_k = \frac{S_k^{ES}}{\langle S_k^{ICT}\rangle - \langle S_k^{DS}\rangle}$$

$$= \frac{e^{ih_k}(A_k^{ES} e^{i\phi_k^{EXT}} + A_k^{IN} e^{i\phi_k^{IN}})}{(A_k^{ICT} e^{i\phi_k^{EXT}} + A_k^{IN} e^{i\phi_k^{IN}}) - A_k^{IN} e^{i\phi_k^{IN}}}$$

$$= e^{ih_k} \frac{A_k^{ES} e^{i\phi_k^{EXT}} + A_k^{IN} e^{i\phi_k^{IN}}}{A_k^{ICT} e^{i\phi_k^{EXT}}}$$

$$= e^{ih_k}\left(\frac{A_k^{ES}}{A_k^{ICT}} + \frac{A_k^{IN}}{A_k^{ICT}} e^{i(\phi_k^{IN} - \phi_k^{EXT})}\right)$$

The second term in the last equation may be given by $$Q_k = \frac{\langle S_k^{DS}\rangle}{\langle S_k^{ICT}\rangle - \langle S_k^{DS}\rangle} = \frac{A_k^{IN}}{A_k^{ICT}} e^{i(\phi_k^{IN} - \phi_k^{EXT})}$$

By computing the square of modulus of $P_k$, the following may be obtained:

$$V_k = P_k P_k^*$$

$$= \left(\frac{A_k^{ES}}{A_k^{ICT}}\right)^2 + \left(\frac{A_k^{ES}}{A_k^{ICT}}\right)\left(\frac{A_k^{IN}}{A_k^{ICT}}\right)\left(e^{i(\phi_k^{IN}-\phi_k^{EXT})} + e^{-i(\phi_k^{IN}-\phi_k^{EXT})}\right) + \left(\frac{A_k^{IN}}{A_k^{ICT}}\right)^2$$

$$= \left(\frac{A_k^{ES}}{A_k^{ICT}}\right)^2 + 2\cos(\phi_k^{IN}-\phi_k^{EXT})\cdot\left(\frac{A_k^{ES}}{A_k^{ICT}}\right)\left(\frac{A_k^{IN}}{A_k^{ICT}}\right) + \left(\frac{A_k^{IN}}{A_k^{ICT}}\right)^2$$

The square of the imaginary part of $Q_k$ gives:

$$W_k = (\text{Im}(Q_k))^2$$

$$= \sin^2(\phi_k^{IN} - \phi_k^{EXT})\left(\frac{A_k^{IN}}{A_k^{ICT}}\right)^2.$$

The difference between $V_k$ and $W_k$ leads to:

$$U_k = V_k - W_k$$

$$= \left(\frac{A_k^{ES}}{A_k^{ICT}}\right)^2 + 2\cos(\phi_k^{IN}-\phi_k^{EXT})\cdot\left(\frac{A_k^{ES}}{A_k^{ICT}}\right)\left(\frac{A_k^{IN}}{A_k^{ICT}}\right) + \left(\frac{A_k^{IN}}{A_k^{ICT}}\right)^2(1-\sin^2(\phi_k^{IN}-\phi_k^{EXT}))$$

$$= \left(\frac{A_k^{ES}}{A_k^{ICT}}\right)^2 + 2\cos(\phi_k^{IN}-\phi_k^{EXT})\cdot\left(\frac{A_k^{ES}}{A_k^{ICT}}\right)\left(\frac{A_k^{IN}}{A_k^{ICT}}\right) + \left(\frac{A_k^{IN}}{A_k^{ICT}}\right)^2\cos^2(\phi_k^{IN}-\phi_k^{EXT})$$

$$= \left(\frac{A_k^{ES}}{A_k^{ICT}} + \cos(\phi_k^{IN}-\phi_k^{EXT})\frac{A_k^{IN}}{A_k^{ICT}}\right)^2.$$

Next $R_k$ may be defined as follows:

$$R_k = \frac{P_k}{\pm\sqrt{U_k} + i*\text{imag}(Q_k)}$$

$$\phi_k = \text{angle}(R_k)$$

Here an assumption is made that $\phi(\text{background}) - \phi(\text{external}) = \pi$.

The rational for proceeding with the above sequence of computations is to extract the phase imparted due to fringe count error from the earth scene spectrum, where the earth scene spectrum is the product of an exponential phase term and the sum of both, the true earth scene spectrum and the spectrum of the instrument background.

Under the assumption of the $\pi$-phase shift, it may be shown that the computation of $R_k$ removes the instrument background and leaves just the exponential phase term.

There is also the effect of the phase response of the bandpass filter. The linear phase response of the filter cancels upon computing the ratio $P_k$. There remains, however, the choice of the square root sign in the computation of the denominator of $R_k$.

One approach may set the sign of the square root in the denominator of $R_k$ to a positive sign, if the earth scene amplitude is greater than that of the instrument background; and to set the sign of the square root to a negative sign, if the earth scene amplitude is less than that of the instrument background. Unfortunately, the exact level of instrument background is not known. The deep space spectrum typically only approximates the instrument background spectrum.

The present invention determines the square root sign by building upon the linear relationship of phase to frequency in Hertz, for a given number of fringe errors:

$$\frac{d\phi}{df} = \text{offringeerrors}*2*\pi*d_{fringe}/v_{mirror}$$

$$\pi = 775 \text{ nm/fringe}$$

$$v_{mirror} = 10 \text{ cm/sec}$$

were $d_{fringe}$ is distance in meters, and
$V_{mirror}$ is velocity of the scan mirror.

Figure 6:
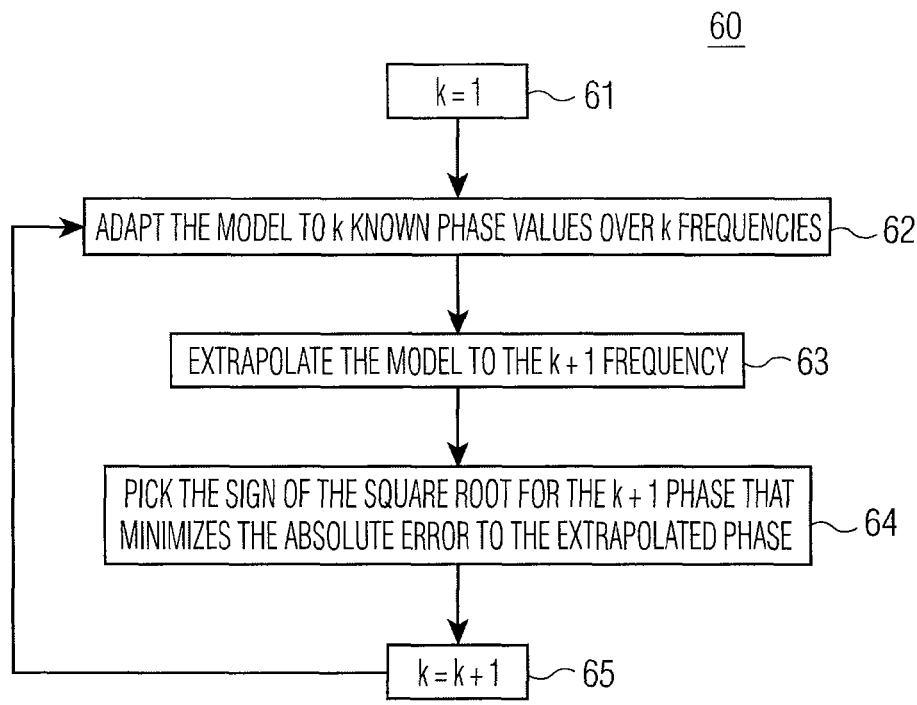
FIG. 6 is a functional flow diagram depicting an exemplary RLS (recursive least squares) method for determining the square root sign of a term of an extraction function, which is used for extracting phase error of an interferometer, in accordance with an embodiment of the present invention.

Referring now to FIG. 6, there is shown an embodiment of the present invention for determining the square root sign, when computing the phase value of:

$$\phi_k = \text{angle}(R_k).$$

As shown, method 60 includes an adaptive algorithm to determine the square root sign. Method 60 starts with k=1 (step 610). The value k is a channel number (or wavenumber) of the interferometer.

An exemplary recursive model used by the method to determine the square root sign is recursive least squares (RLS). Other recursive methods may also be used. The RLS model is described later as an example.

Entering step 62, the method adapts the RLS method to k known phase values over k frequencies.

The method then performs extrapolation (step 63) to determine the phase value at the next channel, or the (k+1)th frequency.

Since the square root sign may be positive or negative, method 60 may select the sign of the square root for the (k+1)th phase that minimizes the absolute error to the extrapolated phase. This step, which is designated 64, is described later.

In step 65, the method increases the channel number by one (k=k+1) and branches back to step 62, in order to adapt the method to the next channel number (k+1). The method continues this iteration until reaching the highest channel number (or highest frequency) of the instrument. It will be appreciated, however, that the present invention may stop the iteration at other intermediary channel numbers, or frequencies.

Turning next to a description of the RLS iterative method (other iterative methods may also be used by the present invention), the following input vector may be defined:

$$x(k) = \begin{bmatrix} 1 \\ f(k) \end{bmatrix}$$

RLS may then proceed over each frequency point by:

$$\varepsilon(k) = \phi(k) - \vec{w}^t(k-1)x(k)$$
$$\vec{g}(k) = P(k-1)x(k)/(\lambda + x^t(k)P(k-1)x(k))$$
$$P(k) = \frac{1}{\lambda}(P(k-1) - \vec{g}(k)x^t(k)P(k1))$$
$$\vec{w}(k) = \vec{w}(k-1) + \varepsilon(k)\vec{g}(k)$$

where
$\varepsilon(k)$ is a scalar error value.
$\vec{g}(k)$ is a gain vector;
$P(k)$ is a covariance matrix;
$\vec{w}(k)$ is a weighting vector;
$\vec{w}^t(k)$ is the transpose vector of $\vec{w}(k)$;
$x^t(k)$ is the transpose of $x(k)$; and
$\lambda$ is a forgetting factor, which is assumed herein to have a value of one.

The RLS method may be initialized at the first frequency, $f(0)=f_{lowest}$, with:

$$\vec{w}(0) = \begin{bmatrix} \phi(0) \\ 0 \end{bmatrix}$$
$$P(0) = \begin{bmatrix} 10 & 0 \\ 0 & 10 \end{bmatrix}$$

where $\vec{w}(0)$ is the phase at f(0). This value is known, because it is usually provided as a characteristic value of the interferometer; and P(0) is a starting value that was found to work properly.

The above initial conditions indicate that the solution starts out as a horizontal line, with no fringe error.

The method extrapolated to the next frequency is:

$$\hat{\phi}(k+1) = w_0(k) + w_1(k) * f(k+1)$$
$$\vec{w}(k) = \begin{bmatrix} w_0(k) \\ w_1(k) \end{bmatrix}$$

Let $\phi^+(k+1)$ be the phase at the (k+1)th point resulting from use of a positive square root sign and let $\phi^-(k+1)$ be the phase at the (k+1)th point resulting from use of a negative square root sign. The correct choice of square root sign may be made by finding:

$$\phi(k+1) = \begin{cases} \phi^+(k+1), & \text{if } |\phi^+(k+1) - \hat{\phi}(k+1)| < |\phi^-(k+1) - \hat{\phi}(k+1)| \\ \phi^-(k+1), & \text{otherwise} \end{cases}$$

Now there are two possible initializations, $$\begin{bmatrix} \phi^+(0) \\ 0 \end{bmatrix} \text{ and } \begin{bmatrix} \phi^-(0) \\ 0 \end{bmatrix}.$$

One possible solution as to which initialization to use is to do both, and pick one of the two final solutions that satisfies some rule.

Another possibility is to choose the final sign of the median phase (the sign of the median of either $\phi^+$ or $\phi^-$) equal to the sign of the mean slope (the sign of the mean of either or $w_1^+$ or $w_1^-$).

A choice of opposite signs may also be used.

An important consideration, however, is to be consistent, because the number of fringe errors may be either positive or negative, and the fringe error may be either to the left of ZPD or to the right of ZPD, the location of zero path difference, thereby giving either a positive or a negative phase. Changing the rule changes the sign of the slope of the phase.

Figure 7:
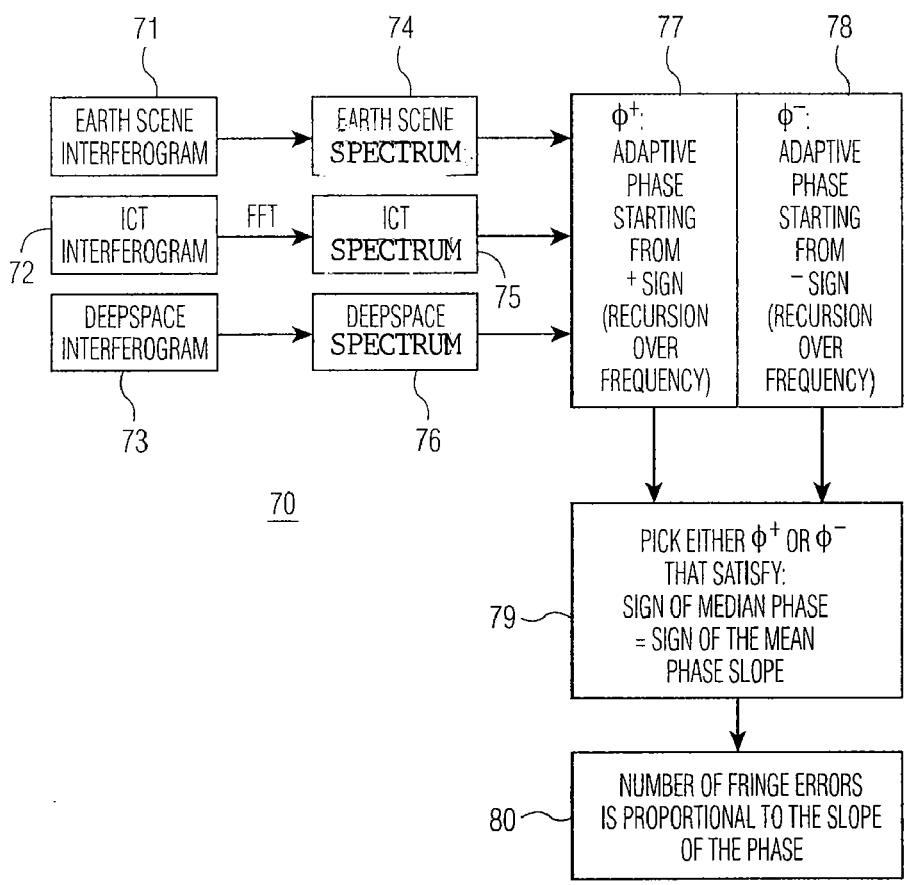
FIG. 7 is a system block diagram showing a system for obtaining three types of interferograms (DS, ICT and ES) and determining fringe errors from these interferograms, in accordance with an embodiment of the present invention.

Referring now to FIG. 7, there is shown a functional block diagram of system 70 for determining fringe count errors using an exemplary RLS process, in accordance with an embodiment of the present invention. As shown, a series of measurements are made to obtain an earth scene interferogram 71, an ICT interferogram 72 and a deep space interferogram 73. A Fourier transform of these interferograms provides, respectively, an earth scene spectrum 74, an ICT spectrum 75 and a deep space spectrum 76.

Initializing the phase, first, as $$\begin{bmatrix} \phi^+(0) \\ 0 \end{bmatrix}$$

resulting by starting from a positive square root sign (step 77) and, second, initializing the phase as $$\begin{bmatrix} \phi^-(0) \\ 0 \end{bmatrix}$$

resulting by starting from a negative square root sign (step 78), the method performs two separate recursions over the frequency band of operation. The method next selects either phase that satisfies the following rule: sign of the median phase is equal to the sign of the mean phase slope (step 79). The final result may be obtained in step 80, which provides the number of fringe errors that are proportional to the slope of the phase.

Figure 8:
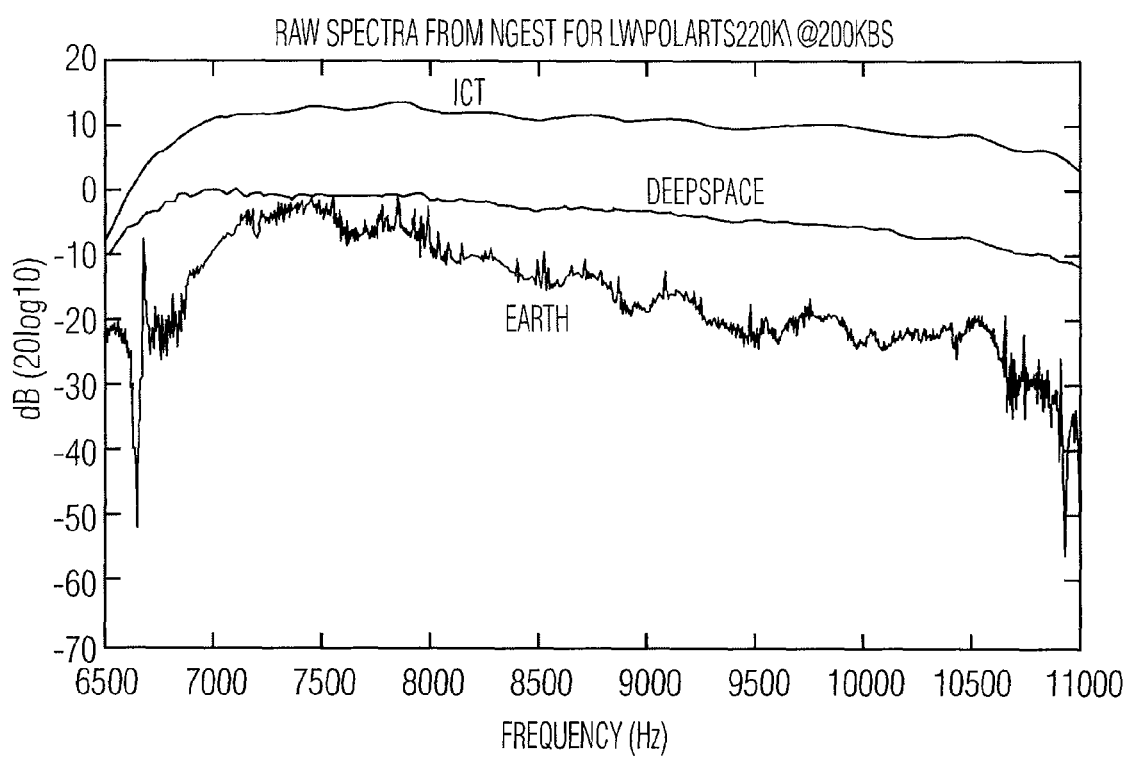
FIG. 8 is an example of spectral plots resulting from raw spectral data observed in DS, ICT and ES scenes, in accordance with an embodiment of the present invention.

An example of spectra taken by an NGEST satellite including ICT, deep space and earth spectra is shown in FIG. 8 without any fringe errors.

Figure 9:
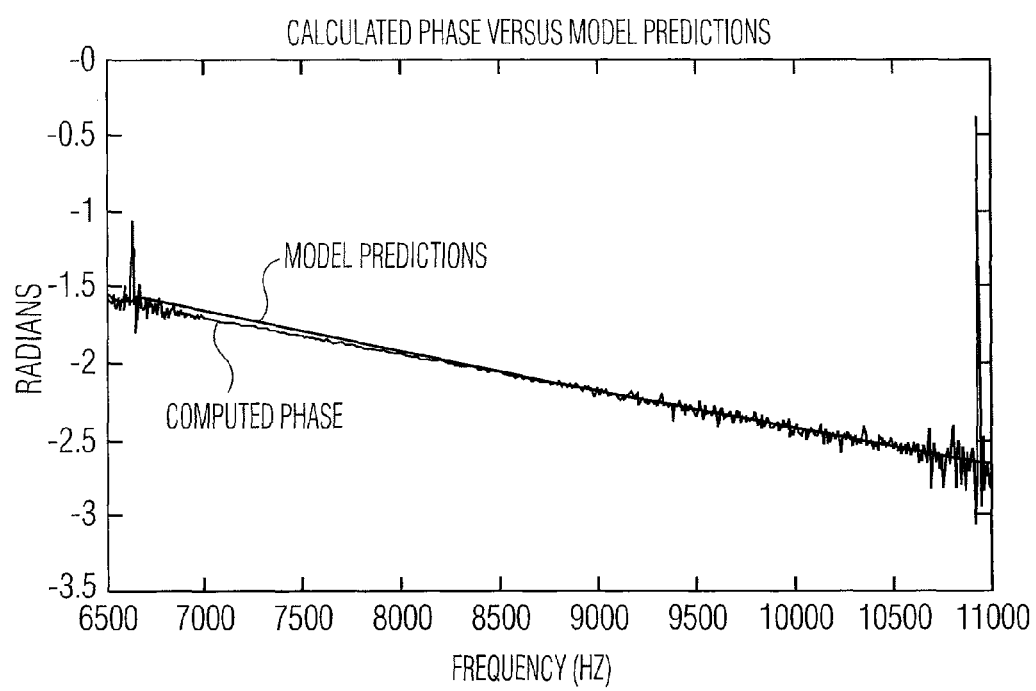
FIGS. 9 and 10 are exemplary plots of radiance versus frequency resulting from various methods of the present invention.

The recovered phase, showing positive and negative signs with an error of 5 fringes is shown in FIG. 9.

Figure 10:
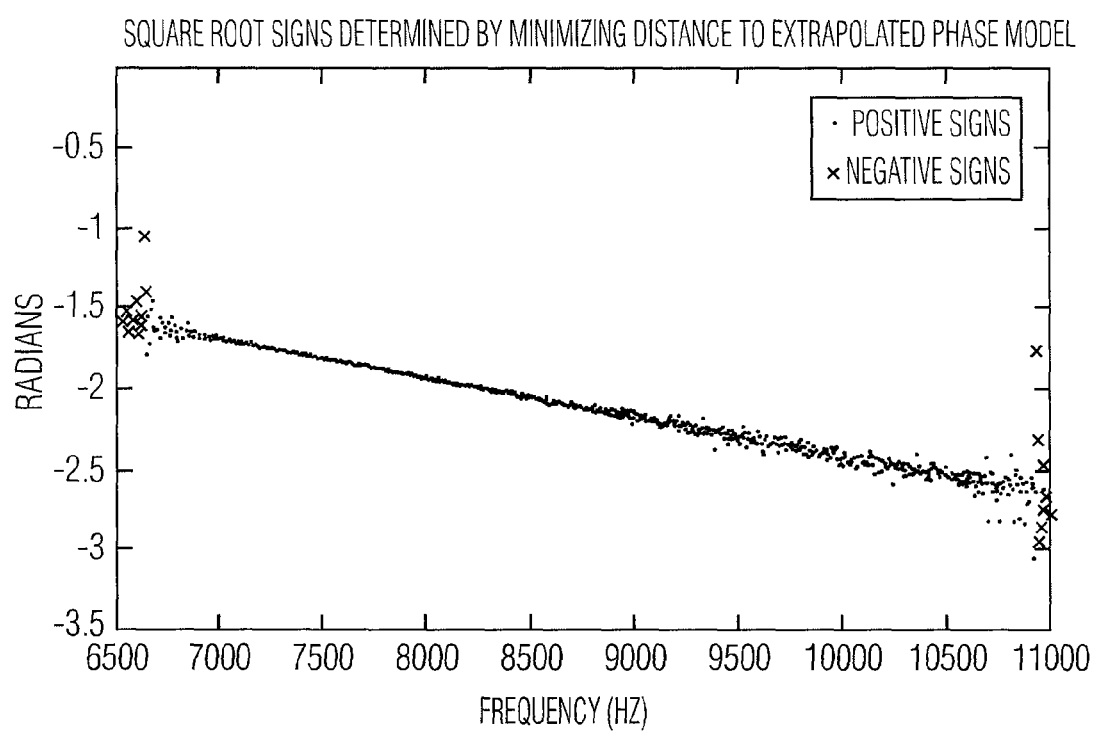

The computed phase, $\phi_k$, as compared to the RLS method predictions $\hat{\phi}_k$ is shown in FIG. 10.

As a check on the results of FIGS. 8 and 9, it is noted that there is a linear relationship of phase to frequency in Hertz for a given number of fringe errors. As previously shown:

$$\frac{d\phi}{df} = \text{\#offringeerrors} * 2 * \pi * d_{fringe} / v_{mirror}$$

$$d_{fringe} = 775 \text{ nm/fringe}$$

$$v_{mirror} = 10 \text{ cm/sec}$$

Thus, from FIGS. 8 and 9, the following may be obtained:

\#of fringeerrors=5=(−2.65+1.55)/(2*π*775×10$^{-8}$*(11000−6500))

The negative sign takes into account the choice of like signs in the solution.

Although the invention is illustrated and described herein with reference to specific embodiments, using an RLS iterative method, the invention is not intended to be limited to the details shown. Rather, various modifications may be made in the details within the scope and range of equivalents of the claims and to without departing from the invention.

What is claimed:

1. A method of extracting phase due to fringe count error (FCE) in spectra formed by an interferometer, comprising the steps of:
    (a) forming an earth scene spectrum
    (b) forming a background reference spectrum;
    (c) forming a phase extraction function, $R_k$, where k is a k$^{th}$ channel of the interferometer, using the formed earth scene spectrum and the background spectrum;
    (d) using recursive least squares (RLS) to extract phase from the $R_k$ function, and
    (e) providing the extracted phase to a user to correct the FCE.

2. The method of claim 1, wherein
    step (c) includes forming a term in the $R_k$ function that includes a positive or a negative sign of a square root; and
    step (d) includes determining whether the sign is negative or positive using the RLS.

3. The method of claim 2, wherein step (d) includes
    extrapolating a phase at channel k to a phase at channel k+1 using the RLS,
    determining a first phase at channel k+1 resulting from using a positive sign of the square root in the phase extraction function,
    determining a second phase at channel k+1 resulting from using a negative sign of the square root in the phase extraction function, and
    selecting one of the determined first or second phase at channel k+1, based on the determined first or second phase that minimizes an absolute error to the extrapolated phase.

4. The method of claim 2, wherein step (d) includes
    determining at least one value of phase at a first frequency, where the first frequency is a frequency operating at channel k=0 of the interferometer; and
    extrapolating the determined value of phase to a next frequency operating at channel k=1 of the interferometer.

5. The method of claim 4, wherein extrapolating the determined value of phase, includes
    determining a first value of phase at channel k=0 assuming a positive sign in the square root of the phase extraction function and extrapolating the first value of phase to a next channel, k=1, of the interferometer; and
    determining a second value of the phase at channel k=0 assuming a negative sign in the square root of the phase extraction function and extrapolating the second value of phase to the next channel, k=1, of the interferometer.

6. The method of claim 5, wherein
    extrapolating the first and second value of phases includes performing a separate RLS over a bandwidth of k frequencies to obtain, respectively, first and second sets of adaptive phases, and
    selecting one of the first and second sets of adaptive phases that satisfies a predetermined rule.

7. The method of claim 6, wherein selecting one of the first and second sets of adaptive phases includes
    selecting one of the first or second sets of adaptive phases that satisfies the following equality:

[the sign of a median phase in the set of adaptive phases]=[the sign of a mean phase slope in the set of adaptive phases].

8. The method of claim 1, wherein
    step (d) includes using the RLS to determine a line having a positive or negative slope, where the line represents phases at k frequencies, and the slope of the line represents a number of fringe errors.

9. The method of claim 8, wherein
    the number of fringe errors is proportional to the slope of the line, and a horizontal line represents no fringe error.

10. The method of claim 1, wherein forming the spectra in steps (a) and (b) includes
    obtaining interferograms, and
    performing a fast Fourier transform (FFT) on each of the interferograms to obtain a respective spectrum.

11. In a phase extraction function of an interferometer at channel number k, where the phase extraction function includes a square root sign that is either positive or negative,
    a method of determining whether the sign is positive or negative, comprising the steps of:
    RLS-computing a first set of phases as a function of channel number k, using the phase extraction function, assuming a positive square root sign beginning at k=0;
    RLS-computing a second set of phases as a function of channel number k, using the phase extraction function, assuming a negative square root sign beginning at k=0; and
    selecting the first or second set of phases based on a predetermined rule; and
    providing the selected first or second set of phases to a user for correcting fringe count errors (FCE) of the interferometer.

12. The method of claim 11, wherein
selecting the first or second set of phases is based on the following sub-steps:
  separately determining a sign of a median phase in the first and second sets of phases;
  separately determining a sign of a mean phase slope in the first and second sets of phases; and
  selecting the first or second set of phases satisfying the following equality:

the sign of the median phase=the sign of the mean phase slope.

13. The method of claim 11, wherein RLS-computing includes
  extrapolating phase from channel k to channel k+1, assuming a positive square root sign;
  extrapolating phase from channel k to channel k+1, assuming a negative square root sign; and
  selecting the extrapolated phase in channel k+1 that minimizes an absolute error to the extrapolated phase.

14. The method of claim 11, wherein
  the RLS-computing includes calculating phase values as a function of frequency,
  wherein the phase values as a function of frequency is a straight line plotted on X,Y axes having a Y-intercept at k=0.

15. The method of claim 11, wherein
  the phase extraction function includes earth scene, and calibration spectra.

16. A computer for executing an algorithm for determining fringe count error (FCE) of an interferometer comprising the steps of:
  forming a phase extraction function from earth scene and calibration spectra, where the phase extraction function varies with frequency and includes a square root sign that is either positive or negative at each frequency; and
  determining whether the square root sign is positive or negative at each frequency using an RLS method.

17. The computer of claim 16, including the steps of:
  letting the square root sign be positive at a starting frequency, and calculating a first set of phases as a function of frequency;
  letting the square root sign be negative at the starting frequency, and calculating a second set of phases as a function of frequency; and
  selecting the first or second set of phases based on a predetermined rule.

18. The computer of claim 17, wherein
  selecting the first or second set of phases is based on satisfying the following equality for each set of phases:

sign of the median phase=sign of the mean phase slope.

19. The computer of claim 16, wherein using the RLS method includes
  extrapolating phase from frequency k to frequency k+1, assuming a positive square root sign;
  extrapolating phase from frequency k to frequency k+1, assuming a negative square root sign; and
  selecting the extrapolated phase at frequency k+1 that minimizes an absolute error to the extrapolated phase.

20. The computer of claim 16, including
  correcting the FCE using an FCE correction algorithm.

* * * * *